United States Patent
Miller

(10) Patent No.: US 8,304,947 B2
(45) Date of Patent: Nov. 6, 2012

(54) ELECTRO-ACTUATED MAGNETIC BEARINGS

(75) Inventor: Seth Adrian Miller, Englewood, CO (US)

(73) Assignee: Empire Technology Development LLC, Wilmington, DE (US)

( * ) Notice: Subject to any disclaimer, the term of this patent is extended or adjusted under 35 U.S.C. 154(b) by 152 days.

(21) Appl. No.: 12/997,503

(22) PCT Filed: Jun. 21, 2010

(86) PCT No.: PCT/US2010/039386
§ 371 (c)(1),
(2), (4) Date: Dec. 10, 2010

(87) PCT Pub. No.: WO2011/162742
PCT Pub. Date: Dec. 29, 2011

(65) Prior Publication Data
US 2011/0309702 A1    Dec. 22, 2011

(51) Int. Cl.
*H02K 7/09* (2006.01)
(52) U.S. Cl. ...................................... 310/90.5
(58) Field of Classification Search .................. 310/90.5
See application file for complete search history.

(56) References Cited

U.S. PATENT DOCUMENTS

| | | | |
|---|---|---|---|
| 3,860,300 A | | 1/1975 | Lyman |
| 3,958,842 A | * | 5/1976 | Telle ............................ 310/90.5 |
| 5,347,870 A | | 9/1994 | Dosch et al. |
| 5,880,546 A | * | 3/1999 | Marroux et al. .............. 310/90.5 |
| 5,929,546 A | * | 7/1999 | Lambert ....................... 310/90.5 |
| 6,404,088 B1 | * | 6/2002 | Barada et al. ................. 310/90.5 |
| 7,977,839 B2 | * | 7/2011 | Barada et al. ................. 310/90.5 |
| 2003/0080638 A1 | * | 5/2003 | Shinozaki ..................... 310/90.5 |
| 2008/0231130 A1 | * | 9/2008 | Chio ............................ 310/90.5 |
| 2009/0079284 A1 | * | 3/2009 | Onuma et al. ................ 310/90.5 |
| 2009/0315421 A1 | * | 12/2009 | Onuma et al. ................ 310/90.5 |
| 2010/0013332 A1 | * | 1/2010 | Vollmer ....................... 310/90.5 |
| 2010/0127589 A1 | * | 5/2010 | Kummeth ..................... 310/90.5 |
| 2010/0247010 A1 | * | 9/2010 | Lee et al. ...................... 384/114 |

FOREIGN PATENT DOCUMENTS

JP     4029613 A     1/1992

OTHER PUBLICATIONS

"International Search Report dated Aug. 16, 2010 for Application No. PCT/US2010/039386".
Cheng, Z. et al., "Field-Activated Electroactive Polymers", *MRS Bulletin*, vol. 33 Mar. 2008, pp. 183-187.

(Continued)

*Primary Examiner* — Thanh Lam
(74) *Attorney, Agent, or Firm* — Dorsey & Whitney LLP

(57) ABSTRACT

Techniques are generally described for adjusting a magnetic field in a magnetic bearing by moving permanent magnets in real time. Some example devices or systems include a magnetic bearing comprising electro-actuators adapted to move permanent magnets relative to a rotor to balance the rotor. For instance, in one example, each electro-actuator includes electro-active material adapted to deform in response to being exposed to an electrical field. This deformity causes permanent magnets attached to a surface of each electro-actuator to move relative to a rotor to balance the rotor. In many examples, a measurement circuit may be coupled to each electro-actuator and adapted to measure a capacitance of each electro-actuator. The capacitance measurement may be used to determine an adjustment signal to adjust the magnetic field in real time.

21 Claims, 4 Drawing Sheets

OTHER PUBLICATIONS

Fernandez, V. et al., "A Design Methodology for Permanent Magnet Mircobearings", *IEEE Transactions of Magnetics*, vol. 36, No. 4 Jul. 4, 2000, pp. 1919-1921.

Fu, H. et al., "Polarization rotation mechanism for ultrahigh electromechanical response in single-crystal piezoelectrics", *Nature*, vol. 403 Jan. 20, 2000, pp. 281-283.

Juuti, J. et al., "Mechanically amplified large displacement piezoelectric actuators", *Sensors and Actuators A: Physical*, vol. 120 2005, pp. 225-231.

Pelrine, R. et al., "High-Speed Electrically Actuated Elastomers with Strain Greater Than 100%", *Science*, vol. 287, No. 5454 Feb. 4, 2000, pp. 836-839.

Plante, J. et al., "Large-scale failure modes of dielectric elastomer actuators", *International Journal of Solids and Structures*, vol. 43, No. 25-26 2006, pp. 7727-7751.

Shahinpoor, M. et al., "Ionic Polymer-MetalComposites (IPMC) as Biomimetic Sensors, Actuators & Artificial Muscles—A Review", *Smart Materials and Structures*, vol. 7, No. 6 Jul. 9, 1998, pp. R15-R30.

Vipperman, J. et al., "Implementation of an Adaptive Piezoelectric Sensoriactuator", *AIAA Journal*, vol. 34, No. 10 Oct. 1996, pp. 2102-2109.

Wang, Z. et al., "Micromachined thick film piezoelectric ultrasonic transducer array", *Sensors and Acturators A: Physical*, vols. 130-131 2006, pp. 485-490.

Wise, Stephanie A., "Displacement properties of RAINBOW and THUNDER piezoelectric actuators", *Sensors and Acuators A*, vol. 69 1998, pp. 33-38.

Zhang, Q. et al., "An all-organic composite actuator material with a high dielectric constant", *Nature*, vol. 419 Sep. 19, 2002, pp. 284-287.

\* cited by examiner

ELECTRO-ACTUATED MAGNETIC BEARINGS

BACKGROUND

Unless otherwise indicated herein, the materials described in this section are not prior art to the claims in this application and are not admitted to be prior art by inclusion in this section.

Magnetic bearings support a rotor using magnetic levitation. In general, magnetic bearings utilize electromagnets to balance forces. In particular, the electromagnets adjust a magnetic field generated by the magnetic bearing to balance the rotor. That is, current applied to the electromagnets may be adjusted in real time in order to adjust the magnetic field to compensate for instabilities that build up in the rotor. Typically, sensors are used to detect the position of the rotor relative to the static electromagnets to determine the amount of current to apply to each electromagnet in order to adjust the magnetic field. Magnetic bearings may be preferred in some applications, since magnetic bearings are capable of operating at higher speed than conventional bearings. By operating in a nearly frictionless environment, magnetic bearings generally do not experience wear caused by friction.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several examples in accordance with the disclosure and are, therefore, not to be considered limiting of its scope, the disclosure will be described with additional specificity and detail through use of the accompanying drawings, in which:

In the drawings.

SUMMARY

Figure 1:
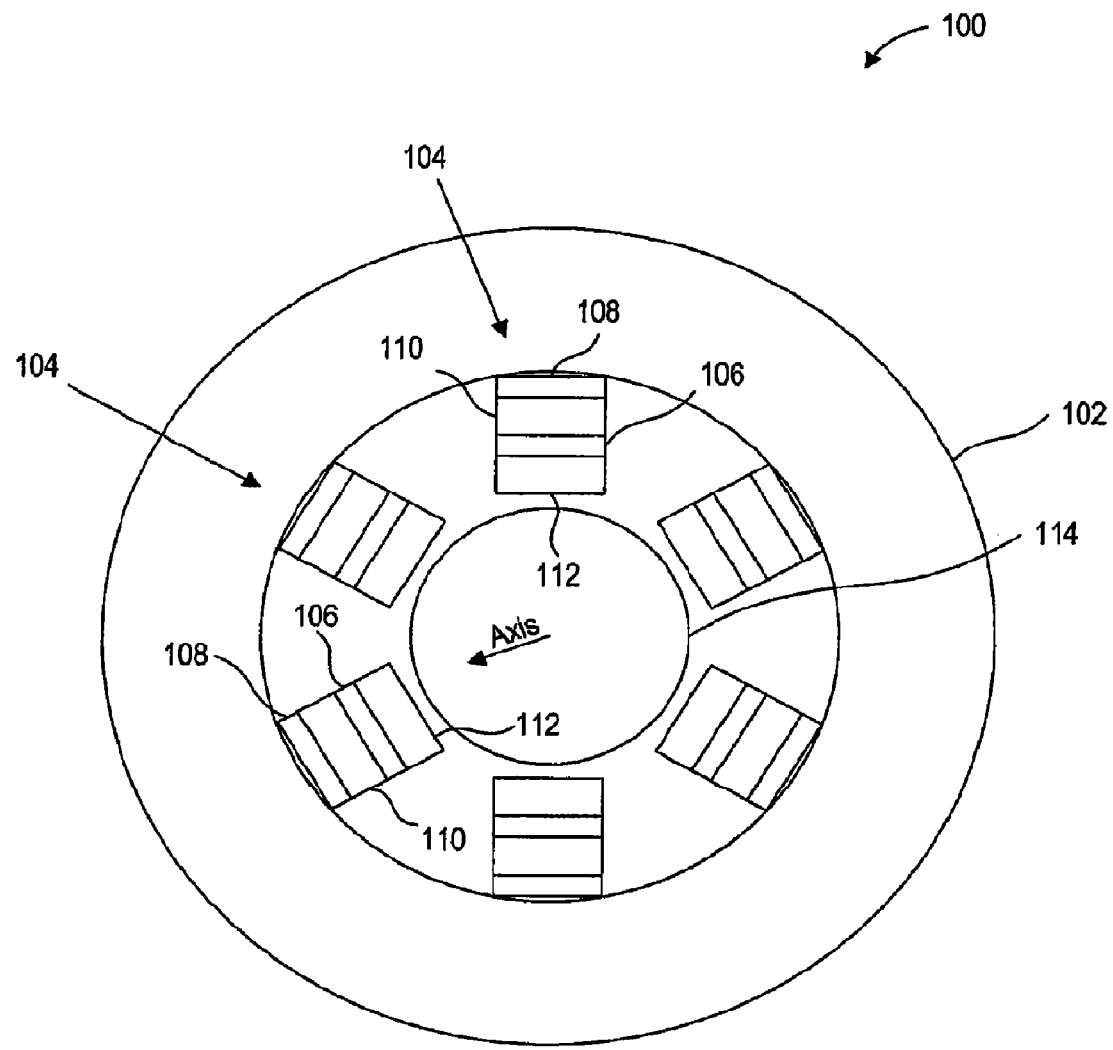
FIG. 1 is a schematic illustration of some example magnetic bearings.

The present disclosure describes a magnetic bearing for balancing a rotor. Some example magnetic bearings may include a plurality of electro-actuators mounted on a support structure. Each of the plurality of electro-actuators may include a first electrode spaced apart from a second electrode and an electro-active material positioned between the first electrode and the second electrode. The electro-active material of each of the plurality of electro-actuators may be configured to deform in response to a voltage difference between the first electrode and the second electrode. A layer of ferromagnetic material may be secured to a surface of the first electrode of each respective electro-actuator. Each layer of ferromagnetic material may be configured to move relative to the rotor as the electro-active material deforms in response to the voltage difference and moving the layer of ferromagnetic material may cause a magnetic field in the magnetic bearing to be adjusted.

The present disclosure describes a system for affecting a magnetic field in a magnetic bearing. Some example systems include a magnetic bearing comprising a plurality of electro-actuators, each of the plurality of electro-actuators including a first electrode spaced apart from a second electrode and an electro-active material positioned therebetween. A respective layer of ferromagnetic material may be secured to a surface of each first electrode. The electro-active material of each electro-actuator may be configured to deform in response to a first voltage difference provided across each respective first electrode and second electrode thereby causing each corresponding layer of ferromagnetic material to move to a first position and affecting the magnetic field in the magnetic bearing. A measurement circuit may be coupled to the magnetic bearing. The measurement circuit may be configured to measure a capacitance of each of the plurality of electro-actuators. A microcontroller may be coupled to the magnetic bearing. The microcontroller may be configured to receive the measured capacitance for each of the plurality of electro-actuators and to generate an adjusted activation signal. A power source may be coupled to the magnetic bearing and the microcontroller. The power source may be configured to receive the adjusted activation signal and in response to receiving the adjusted activation signal, provide a second voltage difference across each respective first electrode and second electrode thereby causing each corresponding layer of ferromagnetic material to move to a second position and affecting the magnetic field in the magnetic bearing.

The present disclosure describes a method of balancing a rotor utilizing a magnetic bearing. Some example methods may include applying a respective first voltage across a respective one of a plurality of electro-actuator having a layer of ferromagnetic material secured to a surface thereof. The first voltage may be applied at a first level. In response to the first voltage, each electro-actuator may contract or expand thereby causing the correspondingly secured layer of ferromagnetic material to move relative to the rotor to affect a magnetic field in the magnetic bearing. The method may further includes measuring a capacitance of each of the plurality of electro-actuators and determining an adjusted level for each respective first voltage. The adjusted level may be a function of the measured capacitance of the corresponding electro-actuator. The method may further include applying a respective second voltage across a respective one of the plurality of electro-actuators. The second voltage may be at the adjusted level. In response to the second voltage, each electro-actuator may contract or expand thereby causing the correspondingly secured layer of ferromagnetic material to move relative to the motor to change a shape and/or strength of the magnetic field in the magnetic bearing.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

The following detailed description, reference is made to the accompanying drawings, which form a part hereof. In the drawings, similar symbols typically identify similar components, unless context dictates otherwise. The illustrative examples described in the detailed description, drawings, and claims are not meant to be limiting. Other examples may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are implicitly contemplated herein.

This disclosure is drawn, inter alia, to methods, systems, devices, and/or apparatus generally related to adjusting a magnetic field in a magnetic bearing by moving permanent magnets in real time. Some example devices or systems include a magnetic bearing comprising electro-actuators adapted to move permanent magnets relative to a rotor to balance the rotor. For instance, in one example, each electro-actuator includes electro-active material adapted to deform in response to being exposed to an electrical field. This deformity causes permanent magnets attached to a surface of each electro-actuator to move relative to a rotor to balance the rotor. In many examples, a measurement circuit may be coupled to each electro-actuator and adapted to measure a capacitance of each electro-actuator. The capacitance measurement may be used to determine an adjustment signal to adjust the magnetic field in real time.

FIG. 1 is a schematic illustration of some magnetic bearings 100 that are arranged in accordance with at least some examples of the present disclosure. The example magnetic bearing 100 includes a support structure 102 with a plurality of electro-actuators 104 formed thereon. Each electro-actuator 104 includes a top electrode 106 and a bottom electrode 108 and an electro-active material 110 positioned therebetween. A layer of ferromagnetic material 112 may be disposed on top of the top electrode 106. Each of the plurality of electro-actuators 104 may be positioned to surround a rotor 114.

Although the electro-actuators 104 may be fixed to the support structure 102, a portion of the electro-actuators 104 may be configured to deform in response to experiencing a magnetic field, and thus move the layer of ferromagnetic material 112 relative to the rotor 114. For instance, a power source may be coupled to each electro-actuator 104 to apply a voltage across the top electrode 106 and the bottom electrode 108 causing the top electrode 106 to be attracted to or repelled from the bottom electrode 108. In response to this attraction, the electro-active material 110 may deform. That is, the attraction force between the top electrode 106 and the bottom electrode 108 causes the top electrode 106 to move in a direction (e.g., a radial-direction) along an axis (e.g., a radial-axis extending from a center of the rotor 114) toward the bottom electrode 108, thereby causing the electro-active material 110 to deform by contracting along the axis. This deformity causes the layer of ferromagnetic material 112 on the top electrode 106 to move farther away from the rotor 114. As the voltage bias applied to the top electrode is reduced to an adjusted activation level, the top electrode 106 move farther away from the bottom electrode 108 thereby causing the electro-active material 110 to expand in the direction (e.g., the radial-direction) along the axis (e.g., the radial-axis). This deformity causes the layer of ferromagnetic material 112 to move closer to the rotor 114. As each layer of the ferromagnetic material 112 on each electro-actuator 104 moves towards or away from the rotor 114, the magnetic field in the magnetic bearing 100 may be adjusted.

The top electrode may be comprised of a material that is stretchable. In some examples, the top electrode may be comprised of a layer of thin gold, conductive organic polymers, carbon nanotube composite materials, or a combination thereof. In some examples the layer of thin gold is about 10 nanometers to 30 nanometers. In one example, the layer of thin gold is about 20 nanometers.

In some examples, the layer of ferromagnetic material 112 may include high anisotropy permanent magnets, such as Samarium Cobalt (SmCo) and Neodymium Iron Boran (NdFeB). The layer of ferromagnetic material 112 may be secured to a surface of the top electrode 106, such as by an adhesive or by any other securing mechanism. In some examples, the layer of ferromagnetic material 112 may be secured to a surface of the top electrode 106 by a flexible adhesive, such as flexible adhesives typically used to join materials with different thermal expansion coefficients. For instance, in one example the adhesive is a polyurethane adhesives or a U1 urethane adhesive. In some examples, the layer of ferromagnetic material 112 may be secured to the top electrode so that the top electrode may stretch without causing the layer of ferromagnetic material to stretch. In some examples, the layer of ferromagnetic material 112 may be assembled on top of the top electrode using standard pick-and-place techniques. In other examples, the layer of ferromagnetic material 112 may be formed by bonding or laminating a thin magnetic film to the top electrodes 106 and subsequently using scribing.

The structural support may be any material capable of supporting forces that may be exerted by the magnetic field in the bearing. In some examples the structural support may comprise a plastic, a composite, a metal, or any combination thereof. In one example, the structural support may comprise stainless steel.

The electro-active material 110 may be any material adapted to deform in response to an applied magnetic field. In some examples, the electro-active material 110 may achieve stretching or compression of less than about 1% and over about 300%. Some example electro-active material may include piezoelectric ceramics or polymers, magnetorheological polymers, and electro-active polymers. The preference of one material over another may depend on the application of the magnetic bearing and other factors, such as cost, reliability, and displacement and voltage requirements. In some examples, the electro-active material 110 may be pre-strained.

In one example, the electro-active material may comprise piezoelectric ceramics, such as piezoelectric transducer (PZT). For instance, although conventional piezoelectric ceramics provide maximum stretching or compression in a range of approximately 0.1% to 0.2%, this displacement would be sufficient to allow an adjustments to be made to a magnetic field. Alternatively, a new generation of piezoelectric ceramics are being developed that may allow strains over 1% to provide larger adjustments to a magnetic field as is described in Fu, Huaxiang et al., *Polarization Rotation Mechanism for Ultrahigh Electromechanical Response in Single-crystal Piezoelectrics*, Nature 403, 1999, 281-283, incorporated herein by reference to the extent it is consistent with this disclosure and for all purposes.

In another example, the electro-active material may comprise piezoelectric. Conventional piezoelectric polymers, such as Polyvinylidene Fluoride (PVDF) and other copolymers, may posses maximum stretching or compression of approximately less than about 1%. Modern piezoelectric polymers may be modified by defects induced by irradiation or an inclusion of bulky functional groups in the polymer chain, and can achieve stretching or compression over 5% in response to about an electric field of 100 volts per micrometer.

In yet another example, the electro-active material 110 may comprise electro-active polymers, such as dielectric elastomers. In one example the electro-active material 110 comprises a film material, such as silicone. Film material may achieve stretching or compression greater than about 30% and in cases where the film material has been pre-strained, stretching or compression greater than about 100% may be achieved. As a result, tens of microns of displacement may be achieved with less than 1 kilovolts of electric charge applied across the electrodes. In addition, film material may respond to applied fields in less than 1 millisecond.

Under Earnsha's theorem, a static field is theoretically not possible to maintain stability of a rotor in a magnetic bearing. Therefore, a magnetic field generated by a magnetic bearing may be adjusted in real time to keep the rotor stabilized. In general, the magnetic field may be adjusted by adjusting the distance between the magnets and the rotor. After each adjustment, a measurement may be made to detect the distance between the magnets and the rotor, thus detecting the forces being applied from the magnetic field. Based on the detected forces, adjustments may be made to balance the rotor.

As will be explained below, not only may each electro-actuator 104 function as an actuator, each electro-actuator 104 may also be utilized as a sensor to sense forces being applied within the magnetic bearing 100. The sensed forces may be used to determine an adjusted level of voltage to be applied to each respective electro-actuator 104. That is, based on the force each electro-actuator 104 experiences, the activation level applied to each electro-actuators 104 may be adjusted to adjust the magnetic field accordingly.

Each electro-actuator 104 may act as a sensor to sense forces, where the sensed forces can be determined by measuring a capacitance. In particular, each electro-actuator 104 includes an electro-active material 110 sandwiched between a top and bottom electrode 106 and 108, and thus forms a capacitor between the plates formed by the electrodes. A measurement circuit (not shown) may be coupled to each of the electro-actuators 104 to measure capacitance. The measurement circuit may be external or integral with the magnetic bearing 100. The measured capacitance may be utilized to calculate forces being applied to each of the electro-actuators 104. In some examples, before measuring the capacitance of the electro-actuators 104, the power source may be decoupled from each of the electro-actuators 104 to achieve steady state. Due to the magnetic field imposed on each electro-actuator 104, the top electrode 106 may be attracted to or repelled from the bottom electrode 108 causing a deformity in the electro-active material 110. That is, the electro-active material 110 may be contracted or stretched along a radial direction towards a center of the rotor. The measurement circuit may be utilized to measure the capacitance of each electro-actuator 104. From the measured capacitance of each electro-actuator 104, the distance between the top and bottom electrodes 106 and 108 of each electro-actuator 104 may be calculated to determine the displacement of the electro-active material 110. Using known material properties of the electro-active material 110 and the displacement of the electro-active material 110, a force applied to each of the electro-actuators may be calculated. Each force applied to each electro-actuator 104 may be analyzed in connection with the geometry of the magnetic bearing 100 to determine an adjusted magnetic field or an adjusted activation voltage level to be applied to the electro-actors 104.

Figure 2:
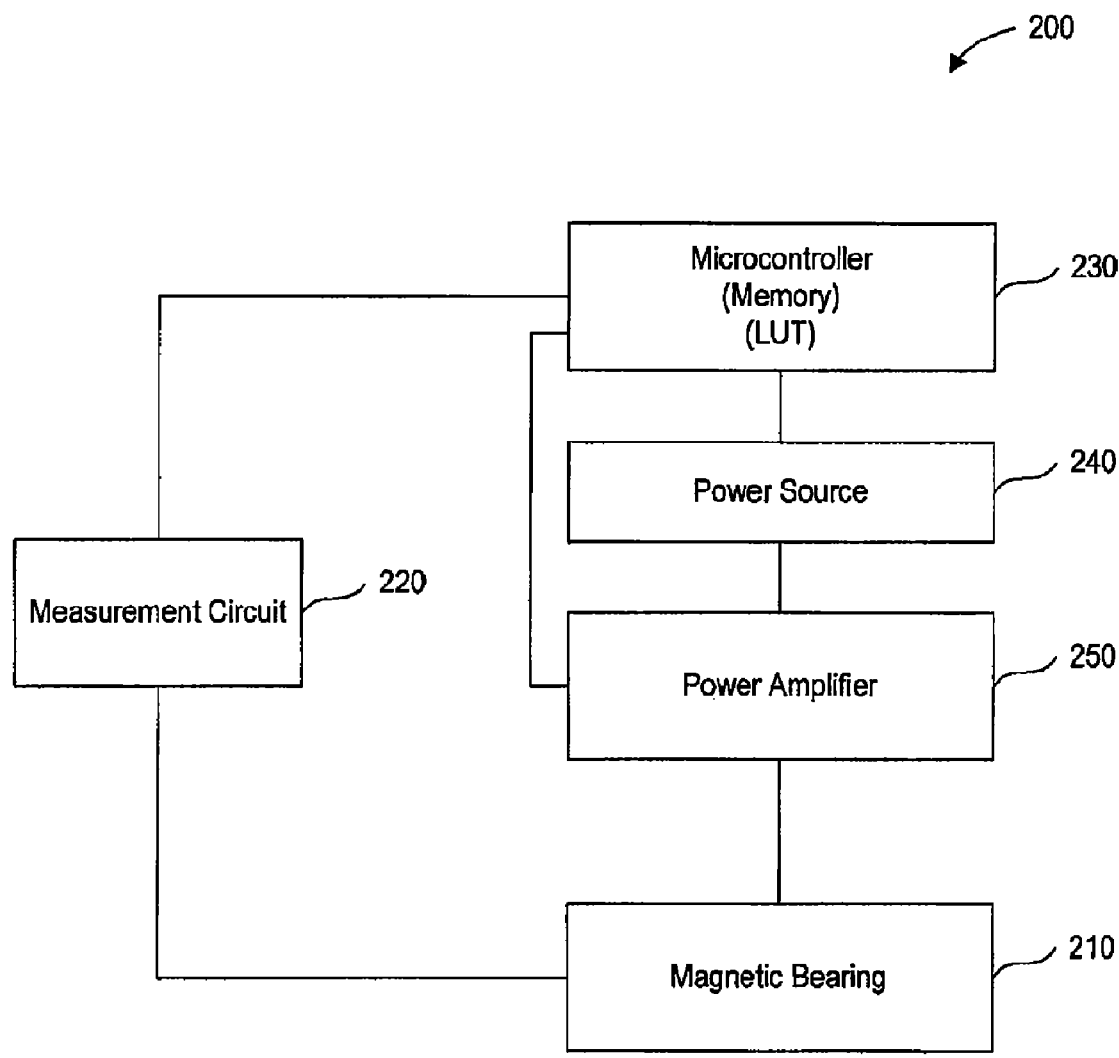
FIG. 2 is a block diagram illustrating some example systems 200 for adjusting a magnetic field in a magnetic bearing.

FIG. 2 is a block diagram illustrating some example systems 200 for adjusting a magnetic field in a magnetic bearing, arranged according to at least some examples of the present disclosure. The example system includes a magnetic bearing 210, such as the example magnetic bearing 100 described in FIG. 1, a measurement circuit 220, a microcontroller 230, a power source 240, and a power amplifier 250. In some examples, the microcontroller 230 includes a memory or may be coupled to an external memory. The magnetic bearing 210 may be coupled to the measurement circuit 220, which may be coupled to the microcontroller 230. The microcontroller 230 may be coupled to the power source 240 and the power amplifier 250, which may be coupled to the magnetic bearing 210, or in some examples, the power source 240 may be coupled directly to the magnetic bearing 210. The power source 240 may be configured to selectively provide a bias voltage or current to each of the electro-actuators.

The microcontroller 230 may be configured to provide an activation signal to the power source 240 to cause the power source 240 to provide a voltage difference across each of the electro-actuators in the magnetic bearing 210. Similarly, the power amplifier 250 may include a plurality of power amplifiers each coupled to a respective electro-actuator in the magnetic bearing 210. In these embodiments, each electro-actuator in the magnetic bearing 210 may be individually addressed and thus receive an individually determined activation level. In particular, the microcontroller 230 may be configured to couple each individually addressed activation level to a respective power amplifier. Each power amplifier may be configured to couple the amplified voltage difference to a respective electro-actuator in the magnetic bearing 210. By coupling an adjusted voltage or current to each respective electro-actuator, the shape and/or strength of a magnetic field in the magnetic bearing 210 may be altered.

As is described above, each electro-actuator includes a capacitor formed by the top and bottom electrodes with the electro-active material provided therebetween. The measurement circuit 220 may be configured to measure a capacitance associated with each capacitor (i.e., the effective capacitance between the top and bottom electrodes) in each electro-actuator. In some examples, the measurement circuit 220 includes a plurality of measurement circuits each coupled to a respective electro-actuator in the magnetic bearing 210. Each capacitance measurement may be utilized to determine the position of each electro-actuator. In some examples, before measuring the capacitance of each electro-actuator, a deactivation signal may be provided by the microcontroller 230 to the power source 240 causing the power source to be decoupled from the electro-actuators 104 and allowing the electro-actuators 104 to achieve steady state.

The microcontroller 230 may be configured to provide a measurement signal to the measurement circuit 220. In response to the measurement signal, the measurement circuit 220 may be configured to measure the capacitance of each electro-actuator. The measured capacitance may then be provided from the measurement circuit 220 to the microcontroller 230. Using the measured capacitance and known geometry and material properties of each electro-actuator, the microcontroller 230 may be configured to calculate the distance between the top and bottom electrodes using the following equation:

$$d = \frac{A \times K}{C}$$

where,
A=area of one of the top or bottom electrodes;
C=capacitance;
d=distance; and
K=dielectric constant.

The distance between the two electrodes on a particular electro-actuator may be used to determine the force being applied to the respective electro-actuator. Assuming the electroactive material behaves linearly, the distance between the top and bottom electrodes may be used to calculate a force being applied to the electro-active material using the following equations:

$$F = \frac{E \times A \times \Delta d}{d_1}$$

wherein,
E=modulus of elasticity of the electro-active material;
F=the force exerted by the electro-active material when stretched or compressed;
A=area of the electro-active material prior to being stretched or compressed;
$d_1$=distance between top and bottom electrodes prior to being stretched or compressed; and
$\Delta d$=change distance between the top and bottom electrodes.

In another example, a look-up table (LUT) or algorithm may be utilized to determine the force being applied to the electro-active material. For instance, in one example a LUT may be used when the electro-active material behaves non-linearly. The LUT may correlate measured capacitance with force. That is, from the measured capacitance of an electro-actuator, the LUT may be accessed to determine the estimated force being applied to the electro-actuator. Although FIG. 2 shows that the LUT and memory may be stored in the microprocessor, it is to be understood the LUT and memory may be stored in a separate device.

From the distribution of forces being applied to each electro-actuator and the geometry of the magnetic bearing, a correction may applied to each activation signal to adjusted an amount of power being applied to each electro-actuator to stabilize the rotor. For instance, in an ideal state, the rotor exerts symmetric forces on each of the electro-actuators. Thus, the microprocessor may be configured to compare actuators on opposite sides and adjust the activation level accordingly. Once the amount of power applied to each electro-actuator has been adjusted, the power may be removed and the forces recalculated as described above. Thus, the example system 200 may continue the cycle of applying power, removing power and measuring capacitance, and using the measured capacitance to adjust the amount of power to be applied.

In some examples, the distance between the top and bottom electrodes may be determined based on a change in distance, rather than calculating the distance from the material properties of the capacitor. In these examples, a capacitor measurement is made of each electro-actuator while the magnetic bearing is in a relaxed state (i.e. no power supplied to the magnetic bearing). The area of one of the electrodes and the dielectric constant of each electro-actuator are assumed to remain constant. Thus, the change in capacitance may be used to calculate a change in distance using the following:

$$d_2 = \frac{C_2 \times d_1}{C_1}$$

where,
$C_1$=measured capacitance in relaxed state;
$d_1$=distance between top and bottom electrodes in the relaxed state;
$C_2$=measured capacitance at time seeking measurement; and
$d_2$=distance between the top and bottom electrodes at time seeking measurement As is described above, $d_2$ may be used to calculate forces being applied to the respective electro-actuator.

Figure 3:
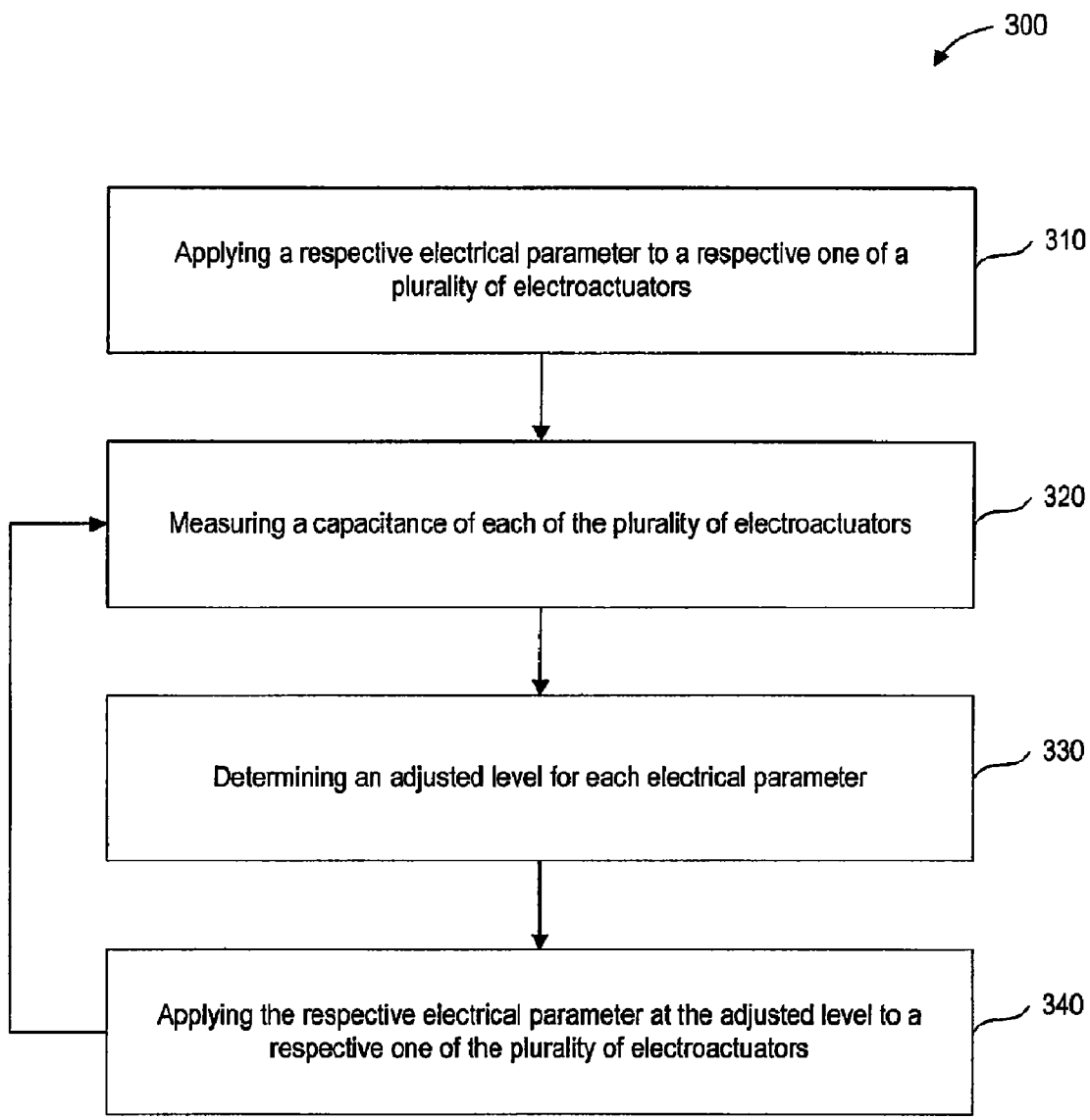
FIG. 3 is a flow chart illustrating some example methods of balancing a rotor utilizing a magnetic bearing.

FIG. 3 is a flow chart illustrating an example method 300 of balancing a rotor utilizing a magnetic bearing that is arranged in accordance with at least some of the examples of the present disclosure. The method 300 may include one or more functions, operations, or actions as illustrated by blocks 310-330. The example method 300 may begin at block 310. In block 310 a respective electrical parameter may be applied (e.g. such as by power source, microcontroller, power amplifier) to a respective one of a plurality of electro-actuators. Block 310 may be followed by block 320. In block 320, a capacitance of each of the plurality of electro-actuators may be measured (e.g. such as by the measurement circuit 220). Block 320 may be followed by block 330. In block 330, an adjusted level for each electrical parameter may be determined (e.g. such as by the micrcontroller). Block 330 may be followed by block 340. In block 340, the respective electrical parameter at the adjusted level may be applied (e.g. such as by power source, microcontroller, power amplifier) to a respective one of the plurality of electro-actuators. The method may continue back to block 320 and repeat blocks 320-340 to continuously measure capacitance and adjust the level of the electrical parameter being applied to each of the plurality of electro-actuators.

The various blocks described herein for method 300 may be performed sequentially, in parallel, or in a different order than those described herein. It should also be appreciated that in some implementations one or more of the illustrated blocks may be eliminated, combined or separated into additional blocks. The described and illustrated method 300 may also include various additional blocks not shown. For instance, the tested resonator and the control resonator may be measured at the same time.

Figure 4:
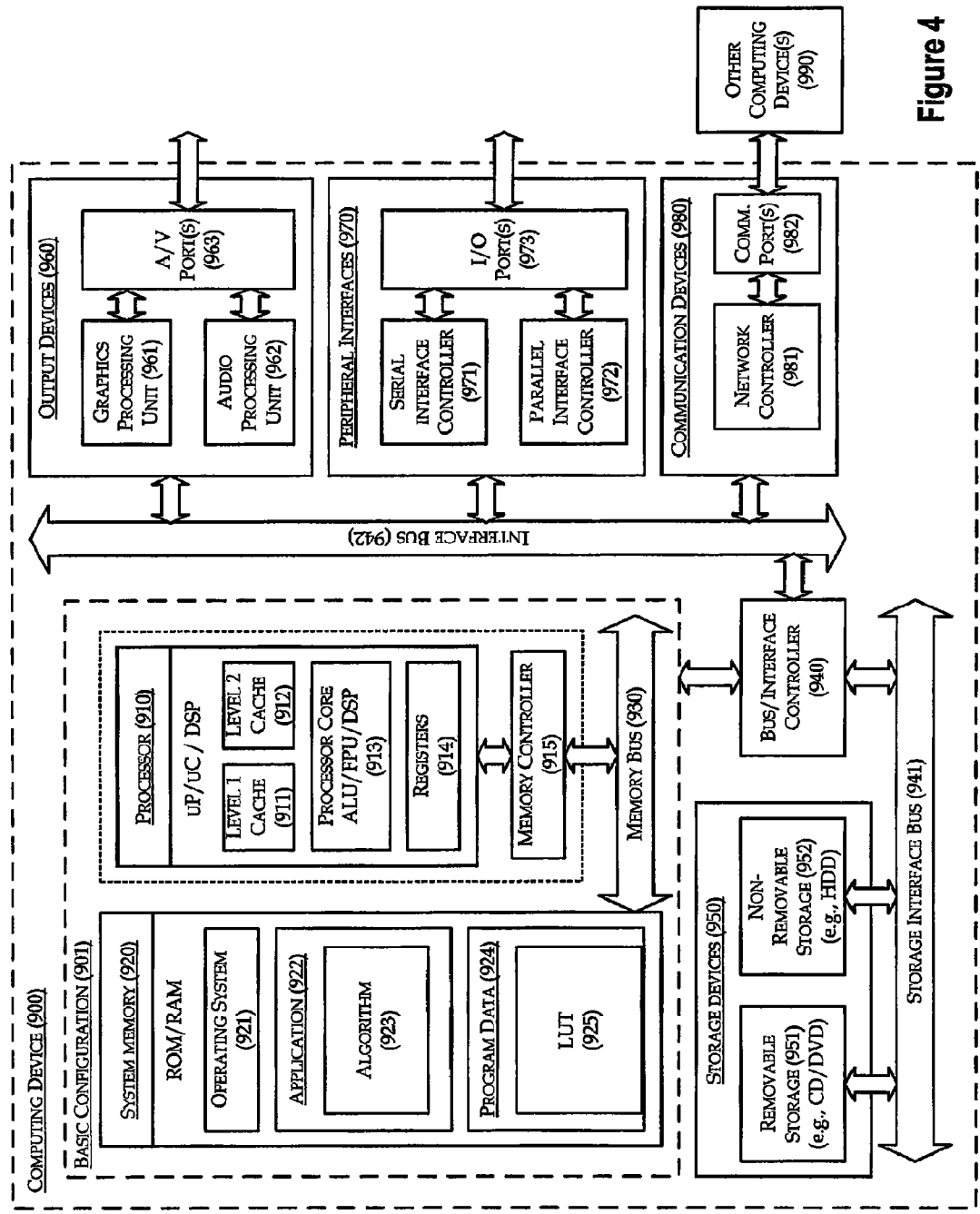
FIG. 4 is a flow diagram illustrating some example methods for; all arranged in accordance with at least some examples of the present disclosure.

FIG. 4 is a block diagram illustrating an example computing device 900 that may be arranged for determining an adjusted level to apply to a respective one of the plurality of electro-actuator in accordance with the present disclosure. The computing device 900 may be substituted for the microcontroller 230 in FIG. 2. In a very basic configuration 901, computing device 900 typically includes one or more processors 910 and system memory 920. A memory bus 930 may be used for communicating between the processor 910 and the system memory 920.

Depending on the desired configuration, processor 910 may be of any type including but not limited to a microprocessor (µP), a microcontroller (µC), a digital signal processor (DSP), or any combination thereof. Processor 910 may include one more levels of caching, such as a level one cache 911 and a level two cache 912, a processor core 913, and registers 914. An example processor core 913 may include an arithmetic logic unit (ALU), a floating point unit (FPU), a digital signal processing core (DSP Core), or any combination thereof. An example memory controller 915 may also be used with the processor 910, or in some implementations the memory controller 915 may be an internal part of the processor 910.

Depending on the desired configuration, the system memory 920 may be of any type including but not limited to volatile memory (such as RAM), non-volatile memory (such as ROM, flash memory, etc.) or any combination thereof. System memory 920 may include an operating system 921, one or more applications 922, and program data 924. Application 922 may include an algorithm 923 configured to determine respective adjusted levels of an electrical parameter to be provided to a respective one of the plurality of electro-actuators. The application may be configured to receive the measured capacitance for each electro-actuator and determine the adjusted level based on the measured capacitance. The application may be further configured to generate adjusted activation signals to be provided to the power source in FIG. 2. Program Data 924 may include a LUT 925 as described above in reference to FIG. 2. The LUT may be used to determine the force being applied to the electro-active material by comparing the measured capacitance to a known force that correlates with the measured capacitance. In some embodiments, application 922 may be arranged to operate with program data 924 on an operating system 921 in accordance with one or more the techniques, methods, and/or processes described herein. This described basic configuration is illustrated in FIG. 9 by those components within dashed line 901.

Computing device 900 may have additional features or functionality, and additional interfaces to facilitate communications between the basic configuration 901 and any required devices and interfaces. For example, a bus/interface controller 940 may be used to facilitate communications between the basic configuration 901 and one or more data storage devices 950 via a storage interface bus 941. The data storage devices 950 may be removable storage devices 951, non-removable storage devices 952, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 920, removable storage 951 and non-removable storage 952 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 900. Any such computer storage media may be part of device 900.

Computing device 900 may also include an interface bus 942 for facilitating communication from various interface devices (e.g., output interfaces, peripheral interfaces, and communication interfaces) to the basic configuration 901 via the bus/interface controller 940. Example output devices 960 include a graphics processing unit 961 and an audio processing unit 962, which may be configured to communicate to various external devices such as a display or speakers via one or more A/V ports 963. Example peripheral interfaces 970 include a serial interface controller 971 or a parallel interface controller 972, which may be configured to communicate with external devices such as input devices (e.g., keyboard, mouse, pen, voice input device, touch input device, etc.) or other peripheral devices (e.g., printer, scanner, etc.) via one or more I/O ports 973. An example communication device 980 includes a network controller 981, which may be arranged to facilitate communications with one or more other computing devices 990 over a network communication link via one or more communication ports 982.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 900 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 900 may also be implemented as a personal computer including both laptop computer and non-laptop computer configurations.

The present disclosure is not to be limited in terms of the particular examples described in this application, which are intended as illustrations of various aspects. Many modifications and examples can may be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and examples are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular examples only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.).

It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to examples containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 items refers to groups having 1, 2, or 3 items. Similarly, a group having 1-5 items refers to groups having 1, 2, 3, 4, or 5 items, and so forth.

While the foregoing detailed description has set forth various examples of the devices and/or processes via the use of block diagrams, flowcharts, and/or examples, such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one example, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the examples disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. For example, if a user determines that speed and accuracy are paramount, the user may opt for a mainly hardware and/or firmware vehicle; if flexibility is paramount, the user may opt for a mainly software implementation; or, yet again alternatively, the user may opt for some combination of hardware, software, and/or firmware.

In addition, those skilled in the art will appreciate that the mechanisms of the subject matter described herein are capable of being distributed as a program product in a variety of forms, and that an illustrative example of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

While various aspects and examples have been disclosed herein, other aspects and examples will be apparent to those skilled in the art. The various aspects and examples disclosed herein are for purposes of illustration and are not intended to be limiting, with the true scope and spirit being indicated by the following claims.

What is claimed is:

1. A magnetic bearing for balancing a rotor, the magnetic bearing comprising:
    a support structure;
    a plurality of electro-actuators mounted on the support structure, each of the plurality of electro-actuators including a first electrode spaced apart from a second electrode and an electro-active material positioned between the first electrode and the second electrode, wherein the electro-active material of each of the plurality of electro-actuators are configured to deform in response to a voltage difference between the first electrode and the second electrode; and
    a plurality of layers of ferromagnetic material, each layer of ferromagnetic material secured to a surface of the first electrode of a respective electro-actuator, each layer of ferromagnetic material being configured to move relative to the rotor as the electro-active material deforms in response to the voltage difference, wherein moving the layer of ferromagnetic material causes a magnetic field in the magnetic bearing to be adjusted.

2. The magnetic bearing of claim 1 wherein each electro-actuator is individually addressable.

3. The magnetic bearing of claim 2 wherein the voltage difference between each of the first electrode and second electrode of each electro-actuator is different for each electro-actuator.

4. The magnetic bearing of claim 1 wherein the first electrode comprises one of a layer of thin gold, conductive organic polymers, carbon nanotube composite materials, or a combination thereof.

5. The magnetic bearing of claim 1 wherein the electro-active material comprises at least one of piezoelectric ceramics, piezoelectric polymers, and/or dielectric elastomers.

6. The magnetic bearing of claim 1 wherein the layer of ferromagnetic material comprises a thin film of ferromagnetic material having a thickness of less than about 10 micrometers.

7. The magnetic bearing of claim 1 wherein the layer of ferromagnetic material is secured to the top electrode with a flexible adhesive.

8. A system for affecting a magnetic field in a magnetic bearing, the system comprising:
    a magnetic bearing comprising a plurality of electro-actuators, each of the plurality of electro-actuators including a first electrode spaced apart from a second electrode and an electro-active material positioned therebetween, a respective layer of ferromagnetic material secured to a surface of each first electrode, the electro-active material of each electro-actuator configured to deform in response to a first voltage difference provided across each respective first electrode and second electrode thereby causing each corresponding layer of ferromagnetic material to move to a first position and affecting the magnetic field in the magnetic bearing;
    a measurement circuit coupled to the magnetic bearing and configured to measure a capacitance of each of the plurality of electro-actuators;
    a microcontroller coupled to the magnetic bearing, the microcontroller configured to receive the measured capacitance for each of the plurality of electro-actuators and to generate an adjusted activation signal; and
    a power source coupled to the magnetic bearing and the microcontroller, the power source configured to receive the adjusted activation signal and in response to receiving the adjusted activation signal provide a second voltage difference across each respective first electrode and second electrode thereby causing each corresponding layer of ferromagnetic material to move to a second position and affecting the magnetic field in the magnetic bearing.

9. The system of claim 8 wherein the electro-active material of each electro-actuator is configured to deform in response to the second voltage difference provided across the first electrode and the second electrode thereby causing the corresponding layer of ferromagnetic material to move relative to the rotor and thus adjust a shape or strength of the magnetic field in the magnetic bearing.

10. The system of claim 9 wherein each electro-active material is individually addressable and each corresponding electrical parameter at a corresponding second level is applied to each respective first electrode approximately simultaneously.

11. The system of claim 10 wherein the first voltage differential provided across each respective first electrode and second electrode is different for each electro-actuator.

12. The system of claim 10 wherein second voltage differential provided across each respective first electrode and second electrode is different for each electro-actuator.

13. The system of claim 8 wherein the electro-active material comprises at least one of piezoelectric ceramics, piezoelectric polymers, and dielectric elastomers.

14. The system of claim 8 wherein the layer of ferromagnetic material comprises a thin film of ferromagnetic material having a thickness of less than about 10 micrometers.

15. A method of balancing a rotor utilizing a magnetic bearing, the method comprising:
    applying a respective first voltage across a respective one of a plurality of electro-actuator having a layer of ferromagnetic material secured to a surface thereof, the first voltage being at a first level, in response to the first voltage each electro-actuator contracting or expanding thereby causing the correspondingly secured layer of ferromagnetic material to move relative to the rotor to affect a magnetic field in the magnetic bearing;
    measuring a capacitance of each of the plurality of electro-actuators;
    determining an adjusted level for each respective first voltage, the adjusted level being a function of the measured capacitance of the corresponding electro-actuator; and
    applying a respective second voltage across a respective one of the plurality of electro-actuators, the second voltage being at the adjusted level, in response to the second voltage each electro-actuator contracting or expanding thereby causing the correspondingly secured layer of ferromagnetic material to move relative to the motor to change a shape and/or strength of the magnetic field in the magnetic bearing.

16. The method of claim 15 wherein each electro-actuator is individually addressable.

17. The method of claim 15 wherein each voltage being applied to a respective one of the plurality of electro-actuators is at a different level.

18. The method of claim 15 wherein applying the respective first voltage and apply the respective second voltage comprises coupling a voltage source or a current source to each electro-actuator.

19. The method of claim 15 wherein determining the adjusted level of each electrical parameter comprises using a look-up table to determine a force being applied to each electro-actuator based on the measured capacitance.

20. The method of claim 15 wherein determining the adjusted level of each respective first voltage comprises using an algorithm and known mechanical properties of the electro-active material.

21. The method of claim 15 further comprising decoupling the voltage source or current source from each of the plurality of electro-actuators, and wherein a time delay between decoupling the voltage from each of the plurality of electro-actuators and applying the respective second voltage across a respective one of the plurality of electro-actuators at the adjusted level is less than about 10 milliseconds.

* * * * *

UNITED STATES PATENT AND TRADEMARK OFFICE
CERTIFICATE OF CORRECTION

PATENT NO. : 8,304,947 B2
APPLICATION NO. : 12/997503
DATED : November 6, 2012
INVENTOR(S) : Miller It is certified that error appears in the above-identified patent and that said Letters Patent is hereby corrected as shown below:

Title Page, Item (56), under "OTHER PUBLICATIONS", in Column 2, Line 3, delete "Polymers",MRS" and insert -- Polymers", MRS --, therefor.

Title Page, Item (56), under "OTHER PUBLICATIONS", in Column 2, Line 4, delete "33" and insert -- 33, --, therefor.

Title Page 2, Item (56), under "OTHER PUBLICATIONS", in Column 1, Line 2, delete "4" and insert -- 4, --, therefor.

Title Page 2, Item (56), under "OTHER PUBLICATIONS", in Column 1, Line 6, delete "403" and insert -- 403, --, therefor.

Title Page 2, Item (56), under "OTHER PUBLICATIONS", in Column 1, Lines 8-9, delete "120 2005 ," and insert -- 120, 2005, --, therefor.

Title Page 2, Item (56), under "OTHER PUBLICATIONS", in Column 1, Line 11, delete "5454 Feb. 4, 2000 ," and insert -- 5454, Feb. 4, 2000, --, therefor.

Title Page 2, Item (56), under "OTHER PUBLICATIONS", in Column 1, Line 15, delete "25-26" and insert -- 25-26, --, therefor.

Title Page 2, Item (56), under "OTHER PUBLICATIONS", in Column 2, Line 3, delete "6" and insert -- 6, --, therefor.

Title Page 2, Item (56), under "OTHER PUBLICATIONS", in Column 2, Line 6, delete "Sensoriactuator",AIAA Journal, vol. 34, No. 10" and insert -- Sensoriactuator", AIAA Journal, vol. 34, No. 10, --, therefor.

Signed and Sealed this
Twelfth Day of March, 2013

Teresa Stanek Rea
*Acting Director of the United States Patent and Trademark Office*

CERTIFICATE OF CORRECTION (continued)
U.S. Pat. No. 8,304,947 B2

Title Page 2, Item (56), under "OTHER PUBLICATIONS", in Column 2, Lines 9-10, delete "Acturators A: Physical, vols. 130-131 2006 ," and
insert -- Actuators A: Physical, vols. 130-131, 2006, --, therefor.

Title Page 2, Item (56), under "OTHER PUBLICATIONS", in Column 2, Lines 12-13, delete "Acuators A, vol. 69 1998 ," and insert -- Actuators A, vol. 69, 1998, --, therefor.

Title Page 2, Item (56), under "OTHER PUBLICATIONS", in Column 2, Line 15, delete "419 Sep. 19, 2002 ," and insert -- 419, Sep. 19, 2002, --, therefor.

In Fig. 4, Sheet 4 of 4, below "PROCESSOR (910)", in Line 1, delete "uP/uC/" and insert -- µP/µC/ --, therefor.

In Column 5, Line 56, delete "electro-actors" and insert -- electro-actuators --, therefor.

In Column 8, Line 17, delete "micrcontroller)." and insert -- microcontroller). --, therefor.

In Column 9, Line 27, delete "(HDD)," and insert -- (HDDs), --, therefor.

In Column 9, Line 29, delete "(SSD)," and insert -- (SSDs), --, therefor.

In Column 9, Line 39, delete "(DVD)" and insert -- (DVDs) --, therefor.